(12) United States Patent
Lee et al.

(10) Patent No.: US 8,588,795 B2
(45) Date of Patent: Nov. 19, 2013

(54) SCHEDULING APPARATUS AND METHOD IN A DISTRIBUTED ANTENNA SYSTEM

(75) Inventors: Jae-Hoon Lee, Seoul (KR); Seong-Taek Hwang, Pyeongtaek-si (KR); Won-Jin Sung, Seoul (KR); Ki-Suk Sung, Seoul (KR); In-Hong Shong, Seoul (KR)

(73) Assignees: Samsung Electronics Co., Ltd (KR); Industry-University Cooperation Foundation Sogang University (KR)

( * ) Notice: Subject to any disclaimer, the term of this patent is extended or adjusted under 35 U.S.C. 154(b) by 781 days.

(21) Appl. No.: 12/419,045

(22) Filed: Apr. 6, 2009

(65) Prior Publication Data
US 2009/0253429 A1 Oct. 8, 2009

(30) Foreign Application Priority Data
Apr. 4, 2008 (KR) .................. 10-2008-0031613

(51) Int. Cl.
*H04W 72/00* (2009.01)

(52) U.S. Cl.
USPC ..... 455/450; 455/451; 455/452.1; 455/452.2; 455/453; 455/464; 370/329; 370/341; 370/347; 370/400; 342/15; 342/153; 343/725; 343/737; 343/751; 343/853; 343/879; 375/131; 375/211; 375/212; 375/220; 375/267

(58) Field of Classification Search
USPC .......... 455/450, 451, 452.1, 452.2, 453, 464, 455/434, 509, 7, 447, 454; 370/15, 329, 370/341, 437, 400; 375/131, 299, 220, 211, 375/212, 267; 342/15, 153, 357.6; 343/725, 343/737, 751, 853, 879
See application file for complete search history.

(56) References Cited

U.S. PATENT DOCUMENTS

| 2006/0092876 | A1 | 5/2006 | Kwak et al. | |
|---|---|---|---|---|
| 2008/0108369 | A1* | 5/2008 | Visotsky et al. | 455/455 |
| 2009/0233544 | A1* | 9/2009 | Oyman et al. | 455/7 |
| 2009/0253429 | A1* | 10/2009 | Lee et al. | 455/434 |

FOREIGN PATENT DOCUMENTS

KR 1020060040549 5/2006

* cited by examiner

*Primary Examiner* — Rafael Pérez-Gutiérrez
*Assistant Examiner* — Thai Vu
(74) *Attorney, Agent, or Firm* — The Farrell Law Firm, P.C.

(57) ABSTRACT

A scheduling method in a distributed antenna system is provided. Each of a plurality of Mobile Stations (MSs), respectively corresponding to each subchannel, are classified as a Single Transmission (ST) MS or a Cooperative Transmission (CT) MS according to a CT criterion. An MS with a maximum channel capacity is selected from among the classified MSs. Resources are allocated to a corresponding subchannel when the selected MS is the ST MS, and resources are allocated using a CT scheduling technique when the selected MS is the CT MS. The classifying, selecting and allocating steps are repeated until allocation of resources is completed.

6 Claims, 5 Drawing Sheets

SCHEDULING APPARATUS AND METHOD IN A DISTRIBUTED ANTENNA SYSTEM

PRIORITY

This application claims priority under 35 U.S.C. §119(a) to a Korean Patent Application filed in the Korean Intellectual Property Office on Apr. 4, 2008 and assigned Serial No. 10-2008-0031613, the entire disclosure of which is incorporated herein by reference.

BACKGROUND OF THE INVENTION

1. Field of the Invention

The present invention relates generally to allocation of wireless resources in a distributed antenna system using a dedicated line and bandwidth. More particularly, the present invention relates to a scheduling apparatus and method for effectively applying technologies related to cooperative transmission between antennas, which is based on prior cooperative information, to channels individually to improve transmission efficiency of a forward link in a multi-channel distributed antenna system.

2. Description of the Related Art

The continuous development of wireless communication systems requires technological advancement in efficient operation and distribution of frequency resources. Related research is presently being conducted in the field of a multi-hop transmission scheme, extended from the existing single-hop transmission scheme, which allows only direct transmission from one Base Station (BS) per cell to a Mobile Station (MS). In a system supporting the multi-hop transmission scheme, a signal from a BS is generally transmitted to an MS via a Relay Station (RS), and direct transmission from the BS to the MS is also possible.

Examples of cellular systems may include a single-hop system, a wireless single-hop system supporting repeaters, and a wireless multi-hop system supporting RSs. In the single-hop system, there is one BS per cell without any repeater, and a terminal, or an MS, is directly connected to the BS without a separate relay operation. The wireless single-hop system supporting repeaters is realized through the additional installation of repeaters between the single-hop systems to improve signal reception performance of MSs located in a cell boundary region or a shadow region. In this system, one cell includes one BS and several repeaters, and an MS can simultaneously transmit and receive signals to/from the BS and the repeaters.

In the wireless single-hop system supporting repeaters, a repeater amplifies not only the signal from a BS but also amplifies interference input from an external cell and transfers the amplified signal. In the wireless multi-hop system supporting RSs, an RS not only can amplify the signal desired by an MS, but also can perform scheduling and dynamic channel allocation on MSs in a sub-cell formed by the RS. Through the use of the wireless RS, the BS can transmit data even to the MSs located in the shadow region where it can hardly transmit the data, thus contributing to an extension of cell coverage and an increase in cell throughput.

As described above, the RS-based multi-hop system may have improved transmission performance compared with the single-hop system or the wireless single-hop system supporting repeaters.

In addition, the RS-based multi-hop system can be regarded as a distributed antenna system that takes charge of one cell together with a BS and RSs. In the distributed antenna system, the BS and the RSs serve as antennas that transmit signals.

In this regard, handoff can be considered as a cooperative transmission scheme between antennas in the current cellular system. The handoff is provided to allow a particular MS to move from a communication area of a particular BS or RS to a communication area of an adjacent cell's BS, without call interruption, by switching to a channel of another BS, i.e. the adjacent cell's BS. The handoff can be roughly classified into two types: hard handoff and soft handoff.

In the hard handoff, if signal strength of the current cell is less than or equal to a predetermined threshold while a particular MS moves to a region of an adjacent cell, the MS cuts off its connection to the old cell and is connected to a channel of a new cell.

In the soft handoff, if signal strength of a new cell is greater than or equal to a predetermined threshold while a particular MS travels to a region of an adjacent cell, the MS simultaneously receives signals transmitted from two BSs. When signal strength of the current cell is less than or equal to a predetermined level, the MS cuts off its connection to the current cell, and receives signals only from the new cell.

The hard handoff may experience call interruption in an environment where a particular MS leaves a service area of the current cell and travels to another cell, but the use of the soft handoff can prevent the call drop by handing over the particular MS to a service area of the new cell. Though the soft handoff prevents the communication failure caused by the MS's movement, it cannot guarantee improvement of transmission capacity of the system in view of the whole cell.

Advanced inter-antenna cooperative transmission technologies, such as Signal Combining and Space-Time Coding, can increase cell transmission efficiency and may be effective in decreasing outage probability due to degradation of signal quality in the cell boundary region. When a particular MS receives a service from two or more RSs, its signal quality and transfer rate increases, compared with when the MS receives a service from one RS. When Single Transmission (ST) is performed in the cell boundary region, the signal quality decreases as an interference signal from an adjacent cell is high in power, probably disabling communication of a certain MS. When cooperative transmission is performed by RSs, the interference source decreases in number and the strength of a received signal increases, enabling the communication and thus contributing to a reduction in an outage probability of the entire cell. However, when N RSs perform cooperative transmission, they may undesirably consume the wireless resources used for single transmission, N times more than usual.

SUMMARY OF THE INVENTION

The present invention has been made to address at least the above problems and/or disadvantages and to provide at least the advantages described below. Accordingly, an aspect of the present invention provides an apparatus and method for performing packet scheduling and dynamic channel allocation for inter-antenna cooperative transmission while sharing multi-channel information of users in a cell through wire/wireless links, thereby increasing transmission efficiency of the entire system in a distributed antenna system supporting inter-antenna cooperative transmission.

According to one aspect of the present invention, a scheduling method in a distributed antenna system is provided. Each of a plurality of Mobile Stations (MSs), respectively corresponding to each subchannel, are classified as a Single Transmission (ST) MS or a Cooperative Transmission (CT) MS according to a CT criterion. An MS with a maximum channel capacity is selected from among the classified MSs Resources are allocated to a corresponding subchannel when the selected MS is the ST MS, and resources are allocated using a CT scheduling technique when the selected MS is the CT MS. The classifying, selecting and allocating steps are repeated until an allocation of resources is completed.

According to another aspect of the present invention, a scheduling apparatus in a distributed antenna system is provided. The scheduling apparatus includes an input unit for receiving a Signal-to-Interference plus Noise Ratio (SINR) from an RS for each of a plurality of subchannels. The scheduling apparatus also includes a determination unit for calculating a transmission capacity depending on the SINR for each of the plurality of subchannels, received from the input unit, applying the transmission capacity to a predetermined CT determination formula, and determining a ST MS and an CT MS according to the formula result. The scheduling apparatus additionally includes a parallel packet scheduler for simultaneously allocating a plurality of serial resources on a spatial axis. An MS is allocated the serial resources in sequence from one BS or from one or more RSs to which the MS belongs. The scheduling apparatus further includes a channel allocator for allocating one of the plurality of subchannels to the MS by accepting a subchannel of the parallel packet scheduler.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF EMBODIMENTS OF THE PRESENT INVENTION

Figure 1:
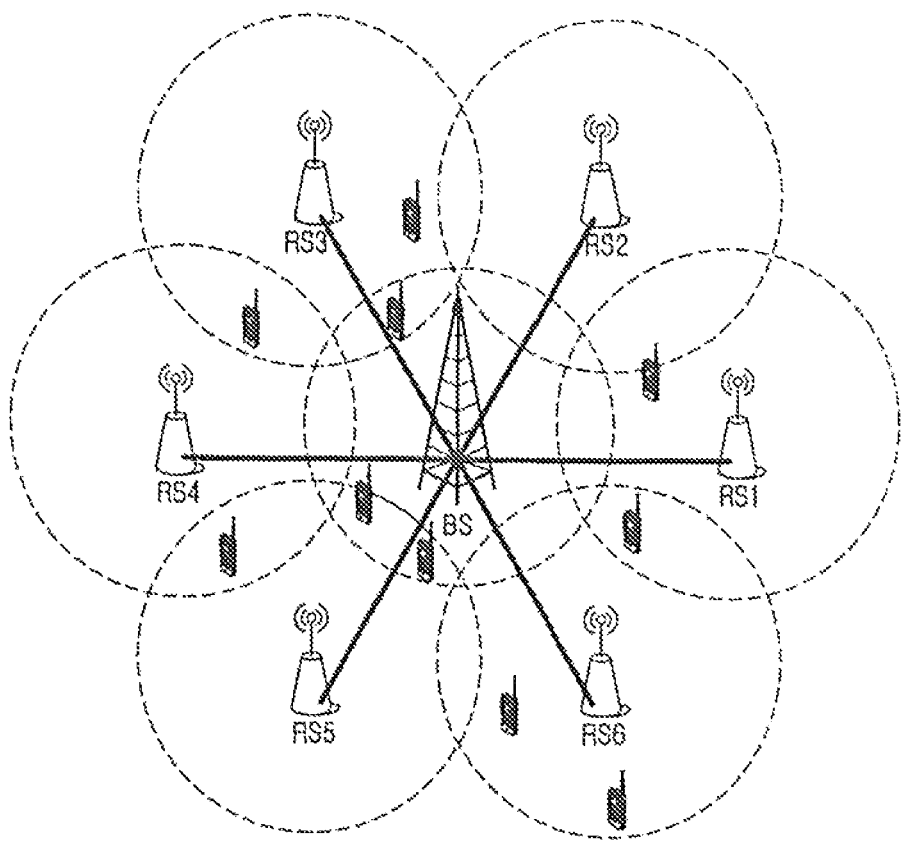
FIG. 1 is a diagram illustrating a schematic configuration of a cellular system using wire RSs, to which the present invention is applicable.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to the bibliographical meanings, but are merely used by the inventor to enable a clear and consistent understanding of the invention. Accordingly, it should be apparent to those skilled in the art that the following description of embodiments of the present invention are provided for illustrative purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In a distributed antenna system, according to an embodiment of the present invention, all algorithms for communication between a BS/RS and an MS are set using, as a basic model, the centralized cellular system, in which they are performed only in the BS. Therefore, control information for all signals is controlled by the BS.

Although the embodiments of the present invention are described herein with reference to a cellular communication system by way of example only, the scheduling apparatus and method proposed by the embodiments of the present invention can also be applied to other communication systems as well as the cellular communication system.

Referring initially to FIG. 1, a diagram illustrates a schematic configuration of a cellular system using wire RSs, to which the present invention is applicable. Specifically, the diagram of FIG. 1 illustrates a configuration of a wire RS-based cellular system in which the number of RSs is assumed to be 6. As illustrated in FIG. 1, one cell can include one BS and 6 RSs, RS1-RS6, and each RS covers its sub-cell region. In this cellular system, an MS in close proximity to a BS directly receives a service from the BS, and an MS having a lower Signal-to-Interference plus Noise Ratio (SINR) of a received signal due to its location at the cell boundary receives a service from an adjacent RS.

In the wire RS-based cellular system, one cell is split into 7 sub-cells by the RSs as illustrated in FIG. 1. The wire RS-based cellular system can efficiently transmit data to MSs distributed in the cell boundaries having a poor channel state or in the regions having many obstacles, due to the cell split effect by the RSs. This system extends a service area of the BS and removing the shadow regions.

A transmission scheme applicable to the wire RS-based cellular system may include an Orthogonal Frequency Division Multiple Access (OFDMA) transmission scheme using multiple carriers. Resource allocation for each MS is assumed to be performed on a subchannel-by-subchannel basis. Because fading channels that individual MSs have experienced are independent of each other, the transmission scheme selects a subchannel favorable to a corresponding MS, i.e. selects a subchannel using multi-user diversity.

In accordance with the above wire RS-based cellular system, an embodiment of the present invention provides a scheduling method in the cellular system, capable of effectively performing inter-RS Cooperative Transmission (CT) technology, in order to allow a BS serving as a Central Processing Unit (CPU) to achieve improvement of system throughput of the entire cell based on channel state information of MSs distributed over the entire system.

The CT technology that performs inter-RS cooperative transmission can be roughly classified into Signal Combining and Space-Time Coding.

One example of the Signal Combining scheme may include Selection Diversity Combining (SDC) for selecting received signals having the best quality from among the signals transmitted from a plurality of RSs and combining the selected signals. Other examples may include Equal Gain Combining (EGC) for phase-matching received signals and combining the phase-matched signals, and Maximum Ratio Combining (MRC) for maximizing a received SINR during signal combining. A representative example of the Space-Time Coding scheme may include Space-Time Block Coding (STBC), which uses two transmission RSs.

When an RS performs Single Transmission (ST) to an MS, an SINR that an arbitrary MS #k receives from an RS #s in a subchannel #n can be expressed as Equation (1).

$$\gamma_{n,k,s}^{ST} = \frac{P_s \cdot |h_{n,k,s}|^2}{\sum_{i \in S} P_i \cdot |h_{n,k,i}|^2 + \sigma^2} \quad (1)$$

In equation (1) $P_s$ denotes transmit power of the RS #s, $h_{n,k,s}$ denotes a channel gain between the MS #k and the RS #s in the subchannel #n, and $\sigma^2$ denotes a Additive White Gaussian Noise (AWGN).

When one or more RSs perform CT to an MS, an SINR can be determined using each of the above three signal combing schemes. First, an SDC's SINR that an arbitrary MS #k receives from a set of at least one RS #s in a subchannel #n can be expressed as Equation (2).

$$\gamma_{n,k,s}^{CT(SDC)} = \frac{\max_{s \in S}(P_s \cdot |h_{n,k,s}|^2)}{\sum_{i \in S} P_i \cdot |h_{n,k,i}|^2 + N_{n,k}} \quad (2)$$

Next, an EGC's SINR that an arbitrary MS #k receives from a set of at least one RS #s in a subchannel #n can be expressed as Equation (3).

$$\gamma_{n,k,s}^{CT(EGC)} = \frac{\left\{\sum_{s \in S} \sqrt{P_s} \cdot |h_{n,k,s}|\right\}^2}{\sum_{i \in S} P_i \cdot |h_{n,k,i}|^2 + \sigma^2} \quad (3)$$

Finally, an MRC's SINR that an arbitrary MS #k receives from a set of at least one RS #s in a subchannel #n can be expressed as Equation (4).

$$\gamma_{n,k,s}^{CT(MRC)} = \frac{\left\{\sum_{s \in S} w_s \cdot \sqrt{P_s} \cdot |h_{n,k,s}|\right\}^2}{\sum_{i \in S} P_i \cdot |h_{n,k,i}|^2 + N_{n,k}}, \quad (4)$$

$$w_{n,k,s} = \frac{h_{n,k,s}^2}{\sum_{i \in S} h_{n,k,i}^2 / |S|}$$

The MRC scheme in Equation (4), as it knows magnitudes and phases of received signals, maximizes a received SINR by multiplying them by a ratio, defined as a weight W, between magnitudes of the received signals, matching the phases and combining the phase-matched signals and S is defined as a set of multiple antennas in a system.

An embodiment of the present invention is described below in two steps, using the possible SINR determined, above. In the first step, MSs are classified into CT MSs and ST MSs to perform a scheduling process more simply. In a second step, a packet scheduling and dynamic channel allocation process for preferentially allocating a channel to an MS in a better channel state among a plurality of MSs located in a cell is performed by a demand-based parallel scheduler designed by considering CT.

(1) Process of Classifying MSs into CT MS and ST MS

When it is assumed that N RSs perform CT, they basically consume N times more wireless resources compared with when ST is performed. Therefore, in terms of the total channel capacity, it is reasonable to perform CT when at least N times more wireless resources are transmitted. Thus, an embodiment of the present invention proposes criteria for classifying MSs into CT MSs and ST MSs for individual channels.

The criteria can be classified into a Shannon criterion based on the channel capacity determined by a Shannon capacity formula, and an Adaptive Modulation and Coding (AMC) criterion based on the number of bits that are actually transmitted using an MCS-level table in AMC transmission.

If a transmission capacity when an arbitrary MS #k receives ST from an antenna #s in a subchannel #n is denoted by $\psi_{n,k,s}^{ST}$ and a transmission capacity when the MS #k receives CT from a set of multiple antennas #s in the subchannel #n is denoted by $\psi_{n,k,s}^{CT}$, the ST and CT transmission capacities can be calculated in accordance with Equation (5) using the SINR values derived from Equation (1) and Equation (2).

$$\psi_{n,k,s}^{ST} = \log_2(1 + \gamma_{n,k,s}^{ST}), \psi_{n,k,s}^{CT} = \log_2(1 + \gamma_{n,k,s}^{CT}) \quad (5)$$

Using Equation (5), CT determination formulas for the Shannon criterion and the AMC criterion are defined as Equation (6) and Equation (7), respectively.

$$D_{n,k}^{shannon} = \frac{\psi_{n,k,s}^{CT}}{N \cdot \psi_{n,k,s}^{ST}} \quad (6)$$

(i) $S_{n,k}^{shannon} \leq 1$: Single Transmission (ii) $D_{n,k}^{shannon} > 1$: Cooperative Transmission Equation (6) represents a CT determination formula for the Shannon criterion.

$$D_{n,k}^{AMC} = \frac{f(\gamma_{n,k,s}^{CT})}{N \cdot f(\gamma_{n,k,s}^{ST})} \quad (7)$$

(i) $D_{n,k}^{AMC} \leq 1$: Single Transmission (ii) $D_{n,k}^{AMC} > 1$: Cooperative Transmission Equation (7) represents a CT determination formula for the AMC criterion.

The calculated ST and CT transmission capacities are applied to the Shannon criterion or the AMC criterion, and MSs are classified as ST MSs or CT MSs according to the application result.

More specifically, if the CT determination formula of Equation (6) or Equation (7) has a value greater than or equal to '1' with respect to an arbitrary subchannel #n, an MS is classified as a CT MS in the subchannel #n. If the CT determination formula has a value less than '1', the MS is classified as an ST MS. Thereafter, the CT determination formula is applied to the Shannon criterion or the AMC criterion, and it is determined whether each of the MSs located in the cell are CT MSs or ST MSs.

The proposed Shannon criterion and AMC criterion can be summarized as shown in Table 1.

TABLE 1

| MCS level x | C/I (dB) | Modulation | Coding rate | # of transmitted bits f(x) |
|---|---|---|---|---|
| 1 | −3.95 | QPSK | 1/12 | 1/6 |
| 2 | −1.65 | QPSK | 1/6 | 1/3 |
| 3 | 1.5 | QPSK | 1/3 | 2/3 |
| 4 | 4.3 | QPSK | 1/2 | 1 |
| 5 | 7.95 | QPSK | 2/3 | 4/3 |
| 6 | 9.3 | 16 QAM | 1/2 | 2 |
| 7 | 13.1 | 16 QAM | 2/3 | 8/3 |
| 8 | 15.8 | 64 QAM | 1/2 | 3 |
| 9 | 18.45 | 64 QAM | 2/3 | 4 |
| 10 | 24.8 | 64 QAM | 5/6 | 5 |

Table 1, f(x) indicates the number of bits actually transmitted at a pertinent Modulation and Coding Scheme (MCS) level. A CT scheme based on the above criteria is described below with reference to an embodiment of the present invention.

Figure 2A:
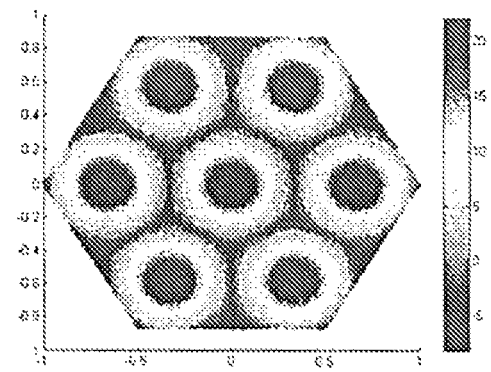
FIGS. 2A to 2C illustrate SINR distributions and their regions of MSs satisfying criteria using ST and CT schemes, according to an embodiment of the present invention.
Figure 2B:
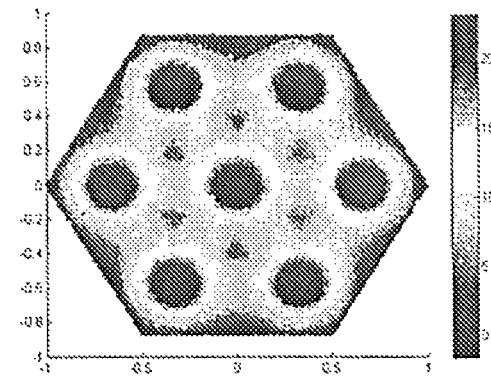
Figure 2C:
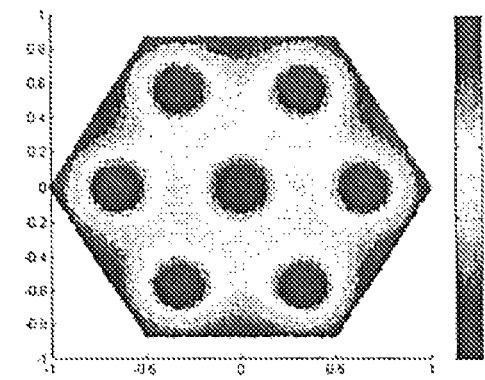

FIGS. 2A to 2C illustrate SINR distributions and their regions of MSs satisfying criteria using ST and CT schemes, according to an embodiment of the present invention.

FIG. 2A illustrates SINR distribution when one RS performs ST, FIG. 2B illustrates SINR distribution when two RSs perform CT, and FIG. 2C illustrates SINR distribution when three RSs perform CT. Because FIG. 2C shows a much higher SINR than FIG. 2B in the sub-cell edge, an outage probability of MSs can be reduced as the number of cooperative antennas using the CT scheme increases.

Because an MS satisfying the criteria is located in the sub-cell boundary of an RS, the MS located in the cell boundary region is a major target MS for CT. As illustrated in FIGS. 2A to 2C, the signal quality improves as the number of RSs performing CT increases. Thus, the improvement of signal quality of MSs with low signal quality may reduce an outage probability of the entire system and increase the channel capacity, thereby reflecting a characteristic effect of CT.

(2) Packet Scheduling and Dynamic Channel Allocation Process

The criteria for application of the CT technique have been described, citing the above-described Shannon criterion and AMC criterion. A scheduling technique supporting CT based on the criteria is described below.

Regarding a CT criterion, N RSs service CT to an MS satisfying the CT criterion, only in the case where the channel capacity when the MS receives CT from N antennas exceeds N times (where N denotes the maximum number of CT antennas) the channel capacity when the MS receives ST from one antenna. That is, the criterion becomes the channel capacity of the ST MS. Performance improvement occurs in terms of the channel capacity, when N RSs simultaneously transmit resources to a corresponding MS, compared with when the corresponding MS receives resources on the time axis N times. An example thereof is described below with reference to Table 2.

TABLE 2

<Capacity Table of "MS 1">

|  | CH4 | CH3 | CH2 | CH1 |
|---|---|---|---|---|
| RS C | 2.1 | 2.3 | 0.5 | 0.1 |
| RS B | 1.8 | 1.9 | 3.5 | 0.8 |
| RS A | 0.6 | 0.5 | 1.7 | 1.4 |
| RS B&C | 4.3 | 5.1 | 4.4 | 0.2 |
| RS A&C | 3.4 | 2.3 | 4.9 | 1.9 |
| RS A&B | 2.5 | 2.0 | 2.1 | 1.6 |

CT < 2ST

Table 2 shows ST and CT capacity tables of a selected MS1. A channel with the maximum channel capacity ST_max and a channel with the maximum channel capacity CT_max are searched for from the ST capacity table and CT capacity table, respectively. In Table 2, ST channels #2 and #4 for an RS B have the maximum channel capacity, and a CT channel #3 for RSs B and C has the maximum channel capacity. Because CT_max does not exceed ST_max as shown in Table 2, channels are allocated at ST_max.

When CT is performed because CT_max is over twice ST_max (CT_max<2ST_max), performance gain can be achieved through a process of converting serial resources, like more than one ST existing on the time axis, into parallel resources capable of allowing MSs to simultaneously receive services from several RSs. An example of this conversion is provided below.

Figure 3:
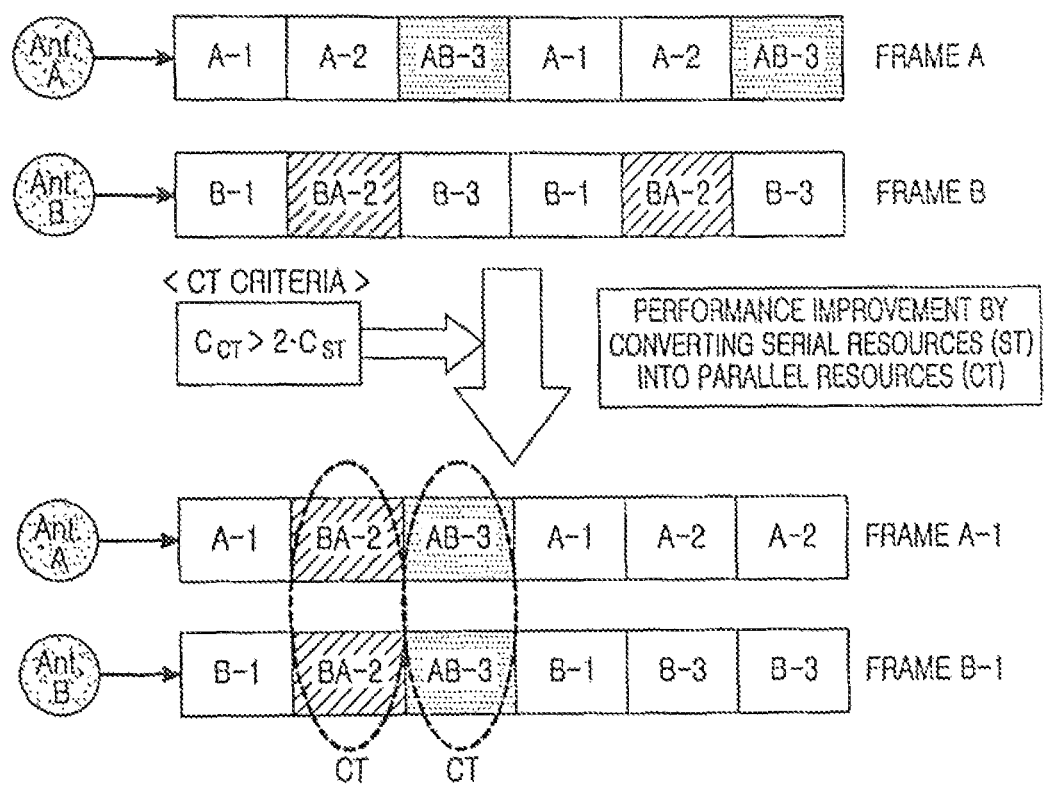
FIG. 3 is a diagram illustrating performance gain achieved by converting serial resources existing on the time axis into parallel resources, according to an embodiment of the present invention.

FIG. 3 is a diagram illustrating performance gain achieved by converting serial resources existing on the time axis into parallel resources, according to an embodiment of the present invention. A technique in FIG. 3 is featured that simultaneously receives the same resources in the spatial dimension while obtaining a spatial diversity gain, instead of receiving the same resources in the time dimension in a divided manner. More specifically, Frame A and B in FIG. 3 are allocated resources sequentially from Antenna A and B, respectively, as illustrated therein. Therefore, the time for receiving AB-3 and BA-2 is different from each other in Frame A and B. In this case, the time for allocating the same resources is also different. However, in Frame A-1 and B-1, serial resources such as AB-3 and BA-2 are converted into parallel resources and the parallel resources are allocated simultaneously. Such a technique is defined as a Serial to Parallel Conversion (SPC) scheduling technique.

The defined SPC scheduling technique is applied to a single-channel system and a multi-channel system in different ways, in performing CT. A process of transmitting resources using the SPC scheduling technique in the single-channel system is first described below.

Figure 4:
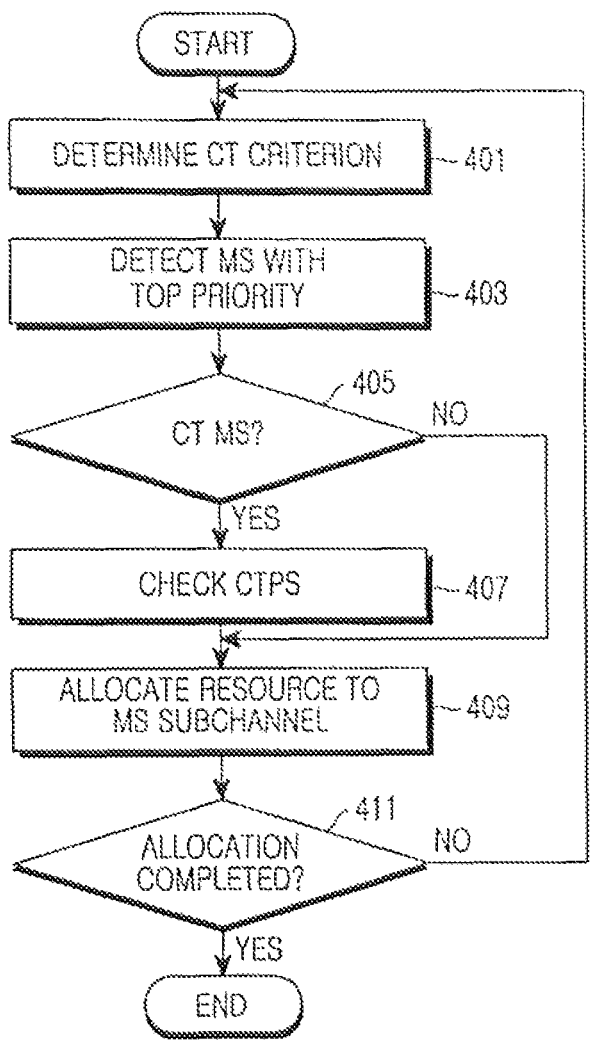
FIG. 4 is a flow diagram illustrating a process of transmitting resources using a CT scheduling technique in a single-channel system, according to an embodiment of the present invention.

FIG. 4 is a flow diagram illustrating a process of transmitting resources using a CT scheduling technique in a single-channel system, according to an embodiment of the present invention. In the case of ST, channel allocation is performed independently by one RS to which an MS belongs.

Referring to FIG. 4, a BS determines a CT criterion for an MS in step 401. The CT criterion is determined by checking if the CT criterion is satisfied for all integers out of the maximum number of CT antennas, allowed by the system. The BS first detects the maximum number of CT RSs, allowed by the system, by measuring SINRs received from all RSs. Among them, an RS with the highest SINR is an RS that performs ST to the MS. The BS determines whether the MS is an ST MS or a CT MS, depending on the SINRs calculated from the detected RSs and the channel capacity of each MS. The above-described CT criterion is used as the criterion for determination. When the CT criterion is not satisfied, the BS decreases the allowed maximum number of CT RSs one by one until the number reaches 2, while determining if the CT criterion is satisfied. After determining whether the MS is an ST MS or a CT MS, a scheduler in the BS determines an MS having the top priority according to a scheduling metric in step 403. In this manner, the BS selects an MS with the highest scheduling metric value among target MSs for scheduling, as an MS with the top priority.

If the MS with the top priority is an ST MS in step 405, the BS allocates resources to a corresponding subchannel in step 409, and if the MS is a CT MS, the BS checks if the CT MS is in a CT Possible State (CTPS) in step 407. If the CT MS is in the CTPS, the BS allocates a subchannel for an MS to a corresponding channel in step 409. The BS repeatedly performs the process of steps 401 to 409 until it is determined in step 411 that allocation for all transmission units has been completed.

A process of transmitting resources using a CT scheduling technique in a multi-channel system is equal to the process of transmitting resources using the CT scheduling technique in ST. However, this process is different from the process of transmitting resources in the single-channel system in that a process of applying the CT scheduling technique in the multi-channel system is added. An ST scheduling technique applicable in the multi-channel environment is described below.

An Applied Frequency Selectivity (AFS) scheduling technique is used as a scheduling technique by which the multi-channel system can use frequency selectivity. The AFS scheduling technique can maximize the entire transmission efficiency by obtaining diversity gain not only on the time axis but also on the channel axis in the multi-channel system having a time-varying characteristic for each recipient. That is, this technique can achieve both multi-user gain and multi-channel gain. In addition, the time-varying characteristic for each recipient can be obtained according to the approach of the scheduling method. The multi-channel system can support CT by applying CT SPC scheduling based on the AFS scheduling technique. A resource transmission process of the CT scheduling technique in the multi-channel system is equal to the resource transmission process in the single-channel system.

Figure 5:
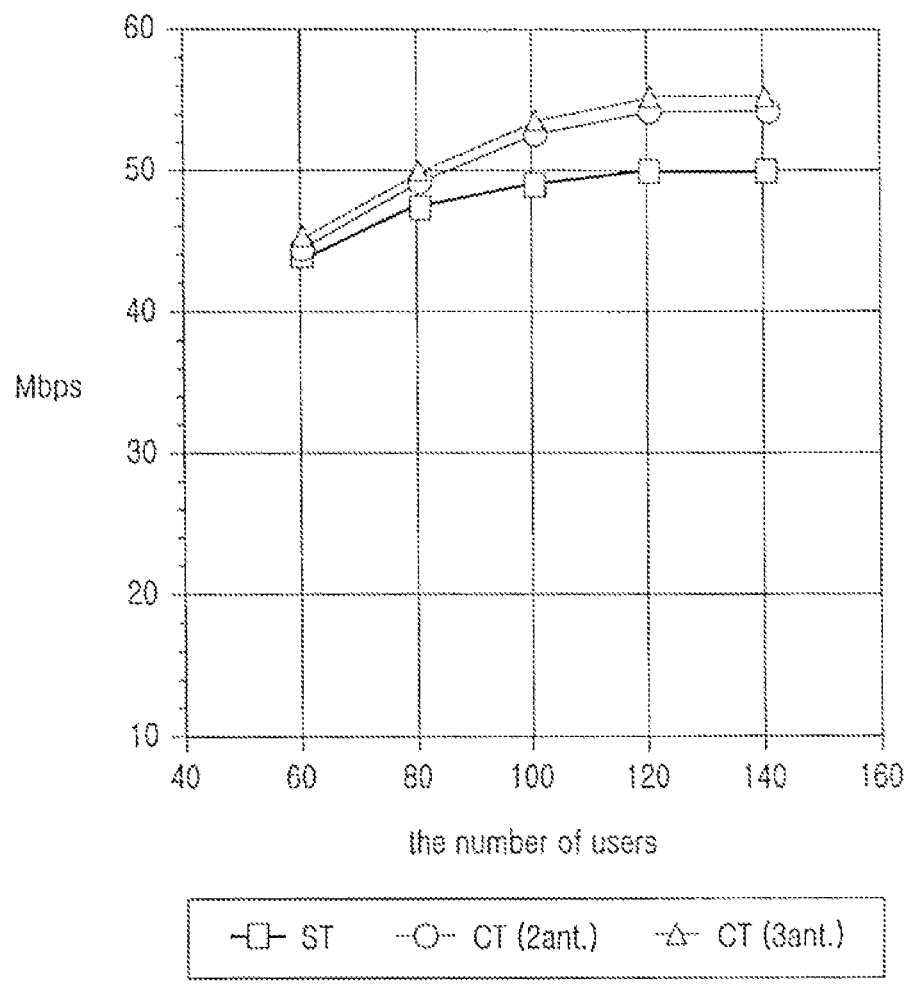
FIG. 5 is a graph illustrating the entire cell transmission efficiency with respect to the number of MSs when CT is performed using an SPC scheduling technique, according to an embodiment of the present invention.

FIG. 5 is a graph illustrating the entire cell transmission efficiency with respect to the number of MSs when CT is performed using an SPC scheduling technique according to an embodiment of the present invention.

It can be appreciated from FIG. 5 that the entire cell transmission efficiency shows an improvement of 10.03%, compared with when only the existing ST is considered. When CT is performed instead of ST, it can be noted in FIG. 5 that despite the use of two or three times more resources, application of the effective scheduling and channel allocation technique improves the quality of received signals at MSs, contributing to an increase in the entire cell transmission efficiency.

In addition, because the packet scheduling and dynamic channel allocation technique determined by considering CT in the single-channel or multi-channel system is the scheduling and channel allocation algorithm suitable for inter-antenna cooperative transmission, determined by considering a multi-antenna gain, it can increase the entire system transmission efficiency in the service area and can be beneficial in terms of fairness.

As is apparent from the foregoing description, the embodiments of the present invention can perform packet scheduling and dynamic channel allocation for inter-antenna cooperative transmission while sharing multi-channel information of users in a cell through wire/wireless links, thereby increasing transmission efficiency of the entire system in a distributed antenna system supporting inter-antenna cooperative transmission.

While the invention has been shown and described with reference to a certain embodiments thereof, it will be understood by those skilled in the art that various changes in form and details may be made therein without departing from the spirit and scope of the invention as defined by the appended claims and their equivalents.

What is claimed is:

1. A scheduling method in a distributed antenna system, comprising the steps of:
    classifying each of a plurality of Mobile Stations (MSs), respectively corresponding to each subchannel, as a Single Transmission (ST) MS or a Cooperative Transmission (CT) MS according to a CT criterion;
    selecting an MS with a maximum channel capacity from among the classified MSs;
    allocating resources to a corresponding subchannel when the selected MS is the ST MS, and allocating resources using a CT scheduling technique when the selected MS is the CT MS; and
    repeating the classifying, selecting and allocating steps until an allocation of resources is completed,
    wherein the step of classifying comprises applying a CT determination formula for all transmit antennas including a corresponding MS, and
    wherein the CT criterion is satisfied when a channel capacity determined when performing CT using one or more CT antennas allowable by the system exceeds N times a channel capacity determined when performing ST using one antenna, wherein N denotes a maximum number of CT antennas, allowed by the system.

2. The scheduling method of claim 1, wherein the classifying step comprises:
    calculating a transmission capacity for each of the plurality of MSs using a Signal-to-Interference plus Noise Ratio (SINR) received from a Relay Station (RS) corresponding to each subchannel; and
    classifying each of the plurality of MSs as the ST MS or the CT MS depending on the calculated transmission capacity of each MS.

3. The scheduling method of claim 2, further comprising:
    when the CT criterion is not satisfied, repeatedly performing the CT determination formula until a number of RSs performing CT becomes 2.

4. The scheduling method of claim 1, wherein the CT scheduling technique allocates a plurality of serial resources in parallel on a spatial axis and simultaneously receives the resources, wherein an MS is allocated the serial resources on a time axis, in sequence, from one Base Station (BS) or from one or more RSs to which the MS belongs.

5. The scheduling method of claim 4, wherein the CT scheduling technique is applicable in both a single-channel system and a multi-channel system.

6. A scheduling apparatus in a distributed antenna system, comprising:
    an input unit for receiving a Signal-to-Interference plus Noise Ratio (SINR) from a Relay Station (RS) for each of a plurality of subchannels;
    a determination unit for calculating a transmission capacity depending on the SINR for each of the plurality of subchannels received from the input unit, applying the transmission capacity to a predetermined Cooperative Transmission (CT) determination formula, and determining a Single Transmission (ST) MS and an CT MS according to the result;
    a parallel packet scheduler for simultaneously allocating a plurality of serial resources on a spatial axis, wherein an MS is allocated the serial resources in sequence from one Base Station (BS) or from one or more RSs to which the MS belongs; and
    a channel allocator for allocating a one of the plurality of subchannels to the MS by accepting a subchannel of the parallel packet scheduler, wherein the determination unit applies a CT determination formula for all transmit antennas including a corresponding MS, and wherein the CT criterion is satisfied when a channel capacity determined when performing CT using one or more CT antennas allowable by the system exceeds N times a channel capacity determined when performing ST using one antenna, wherein N denotes a maximum number of CT antennas, allowed by the system.

* * * * *